(12) United States Patent
Masleid et al.

(10) Patent No.: US 6,532,544 B1
(45) Date of Patent: *Mar. 11, 2003

(54) HIGH GAIN LOCAL CLOCK BUFFER FOR A MESH CLOCK DISTRIBUTION UTILIZING A GAIN ENHANCED SPLIT DRIVER CLOCK BUFFER

(75) Inventors: Robert Paul Masleid, Monte Sereno, CA (US); Donald George Mikan, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,871

(22) Filed: Nov. 8, 1999

(51) Int. Cl.[7] .............................. G06F 1/06; G06F 1/04
(52) U.S. Cl. ..................... 713/500; 713/501; 713/503
(58) Field of Search ................................ 713/500, 501, 713/503; 714/700

(56) References Cited

U.S. PATENT DOCUMENTS 5,239,215 A * 8/1993 Yamaguchi ................ 326/101
5,610,548 A   3/1997 Masleid .................... 327/374
5,656,963 A   8/1997 Masleid et al. ............. 327/297
5,668,484 A * 9/1997 Nomura .................... 326/101
6,025,738 A * 2/2000 Masleid .................... 326/83

OTHER PUBLICATIONS

Hidekazu et al, Basic Concept of Cooperative Timing–driven Design automation Technology for High–speed RISC Processor.

Qing et al, Optimal Sizing of High–Speed Clock Networks Based on Distributed RC and Lossy Transmission Line Models, 1993, pp. 628–633.

* cited by examiner

Primary Examiner—Thomas Lee
Assistant Examiner—Suresh K Suryawanshi
(74) Attorney, Agent, or Firm—Mark E. McBurney; Bracewell & Patterson, L.L.P.

(57) ABSTRACT

An on-chip clock distribution system and method which utilizes local clock buffers to provide an improved clock signal distribution while avoiding the disadvantages of conventional central buffer and repowered distribution systems. The system also reduces distribution routing problems and distributes "delta-I" problem and thermal problem, and also supports better local delay tuning.

11 Claims, 3 Drawing Sheets

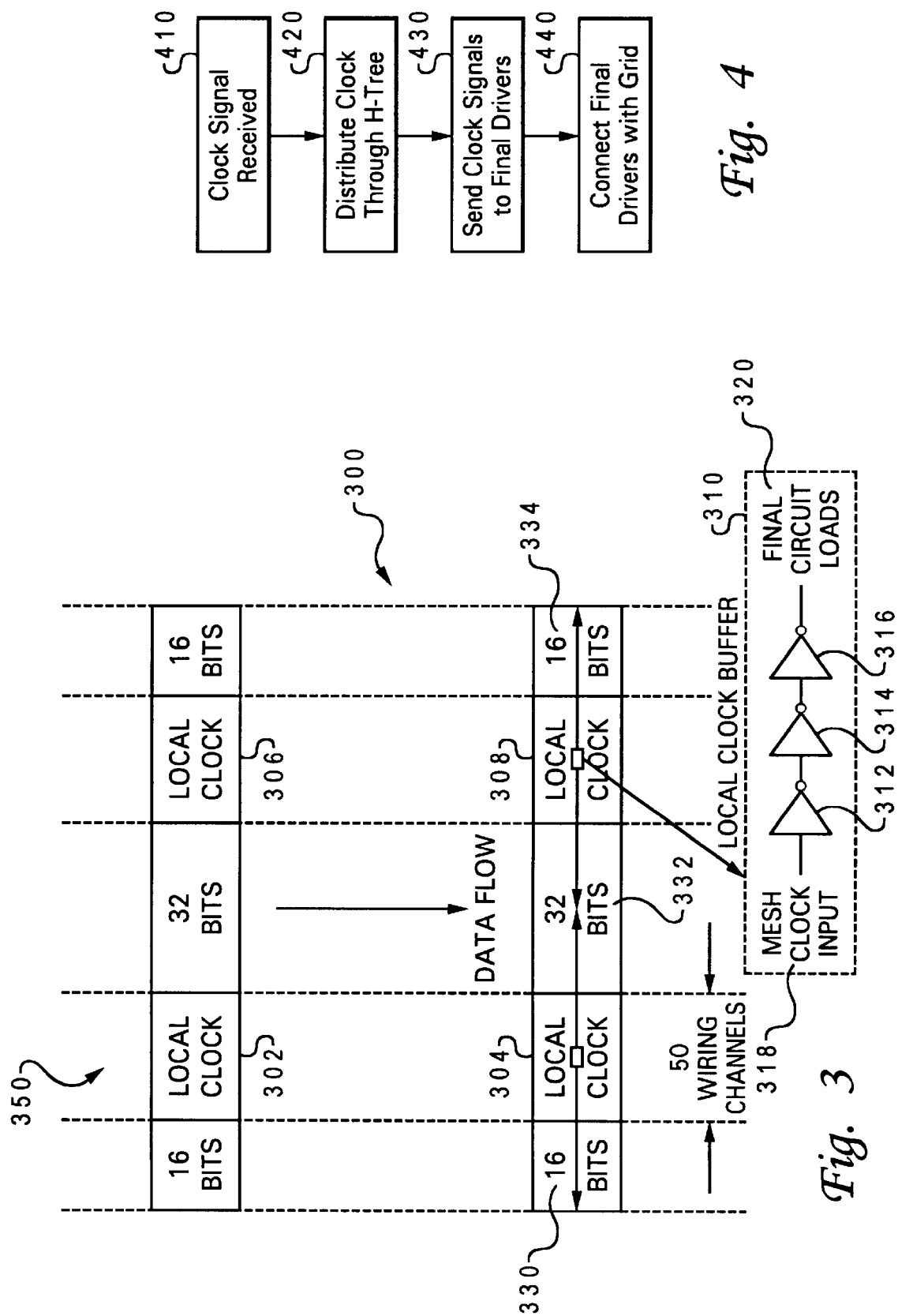

HIGH GAIN LOCAL CLOCK BUFFER FOR A MESH CLOCK DISTRIBUTION UTILIZING A GAIN ENHANCED SPLIT DRIVER CLOCK BUFFER

BACKGROUND OF THE INVENTION

1. Field of the Invention

The present invention generally relates to VLSI microprocessors, and more particularly to timing logic within a microprocessor. Still more particularly, the present invention relates to clock signal distribution within a microprocessor.

2. Description of the Prior Art

In current high-speed microprocessor systems, the on-chip clock design has become a much more significant and important design problem than in any past VLSI microprocessor chip design, because the clock frequency target is 1.1 Ghz, which means less than 1.0 nanosecond total chip cycletime. Uncertainties or delay skew in the clock signals arriving at the latches and registers detract directly from the cycle time.

The target for clock skew is to be less than 125 picoseconds locally and less than 250 picoseconds globally. 250 picoseconds is 0.25 nanoseconds, or 25% of the total cycle. This then deserves a major design effort to reduce the skew to allow more time in the cycle for the necessary logical operations.

Making the task more difficult is the larger chip size required to hold all of the processor circuitry and arrays. The clock must be distributed to every latch on the chip.

Typical clock distribution issues relate to problems in systems with a central clock buffer and systems with repowered clock distribution.

Central Clock Buffers

There are many problems related to a central clock buffer such as that found in the DEC ALPHA chip. Among these problems is increased skew or delay uncertainty in the distribution from the central buffer to the load point as the chip size is increased. The total load capacitance has increased dramatically as chip size and the number of gates has increased.

In these conventional system, the chip clock utilizes a centrally located buffer for the clock signal. While this has design advantages, the increased power necessary to drive the clock over the entire chip, as chip size has increased, has become problematic. The centrally located buffer switches all the loads from a central physical location on the chip thus causing a very large concentrated "delta-I" problem in that area that can collapse the power source at that point causing nearby circuits to fail. It is also difficult to construct clock routes away from the buffer with an adequately low impedance.

Central clock distributions feature a single, an relatively large, central clock buffer driving a low-resistance clock grid. The grid, in turn, drives the end-user circuits directly. Central distributions are attractive for several reasons, including the fact that all of the circuit-delay-based variation is contained in the central buffer and is mostly common to all chip circuits which receive the clock signal, and that large numbers of parallel paths in the clock grid tend to average out wire-delay-based variation to individual circuits.

Because of the inherent delay in the transmission of the clock signal, clock time is 'curved' across the chip, i.e., circuits get the clock later as the distance from the central buffer increases. This aspect of signal distribution is carefully evaluated and exploited in the machine design.

There are, however, significant drawbacks to the use of a central clock buffer. These include, for example, the fact that the large, centralized buffer stresses the central power distribution and requires a considerable area of decoupling capacitance nearby. Further, transmission line resistance and inductance limits how effectively a load can be driven by a remote buffer, no matter how large the central buffer is. A large grid cross-section is required to keep grid sheet resistance well below driver resistance. The return path must be just as substantial from both a resistance and inductance point of view.

Repowered Clock Distribution

Repowered clock distributions use a much smaller central buffer, local clock regenerators, and possibly sector buffers in between. Repowered distributions are found in many processors manufactured by, for example, the IBM Corporation. Repowered distributions are have several advantages over a central clock buffer in that the central buffer is modest and presents no hazard to the local power distribution. Moreover, less wiring cross section is required since most loads are a shorter distance from their drivers. Further, unlike the clock-time curve found in central-buffer distribution systems, circuits all over the chip get the clock at nearly the same time.

Repowered distribution also has some significant problems, however, including the circuit-delay-based variation necessarily found the distributed drivers, which is not an issue in central-buffer distribution systems, since the circuit delay in a central-buffer is common to the entire circuit. Further, since several stages of repowering or redrive is used, some very long wires are required, with a significant wire delay time constant caused by the RC time constant of the wires themselves.

Other considerations of both approaches include those of delta-I problems and thermal problems. As the clock signal is distributed, a self-induced switching noise caused by inherent transmission-line inductances. This noise is generally known as Delta-I noise. Delta-I noise is a function of conductor length, conductor spacing, conductor diameter and assigned voltage levels. See, for example, "Delta-I Noise Specification for a High-Performance Computing Machine" by George A. Katopis, in Proceedings of the IEEE, Vol. 73, No. Sep. 9, 1985, which is hereby incorporated by reference.

Heat, of course, is a consideration in any processor, and both central-buffer systems and repowered distribution systems must accommodate any thermal generation.

Clock distributions have several physical properties that must also be considered. For example, clock distributions are comprised of amplifier chains and distribution wiring. From a PLL-like clock source to final circuit clock load they must develop a gain of approximately 100,000. For minimum clock latency (delay through the clock distribution) optimal gain per simple inverter stage is approximately 3, so approximately 10 inverters are required to develop this gain.

Consequently, jitter is insensitive to clock load. Fairly large changes in clock load (3×) change the latency of the amplifier chain by only one stage or ~10%. This means clock latency and its associated jitter change at most 10% for 3× change in clock load. Further, most clock power is in the last stage. Gain chains have a strongly skewed distribution of power consumption, starting with a whisper and ending in a bang. Each successive stage dissipates 3× the power of the previous stage. In a 10 stage chain, 66% of the power is dissipated switching the final load. 22% is dissipating switching the input capacitance of the 10th inverter. 7% is used by the 9th inverter. Only 1% is used by the 7th inverter and earlier stages are negligible.

Because clock power in early stages is negligible, considerable capacitance and power inefficiency can be tolerated in the 1st through 7th stages with little increase in clock power. Design of these early stages can use extra capacitance and power to decrease sensitivity to design and process.

SUMMARY OF THE INVENTION

It is therefore one object of the present invention to provide an improved VLSI microprocessors.

It is another object of the present invention to provide improved timing logic within a microprocessor.

It is yet another object of the present invention to provide improved clock signal distribution within a microprocessor.

The application presents an on-chip clock distribution system which utilizes local clock buffers to provide an improved clock signal distribution while avoiding the disadvantages of conventional central buffer and repowered distribution systems. The disclosed system also reduces distribution routing problems and distributes "delta-I" problem and thermal problem, and also supports better local delay tuning.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 3 is a bit slice definition in accordance with a preferred embodiment of the invention; and FIG. 4 is a flowchart of a method for distributing an external clock signal to various segments of a chip in accordance with a preferred embodiment of the invention.

DESCRIPTION OF THE PREFERRED EMBODIMENT

Figure 1:
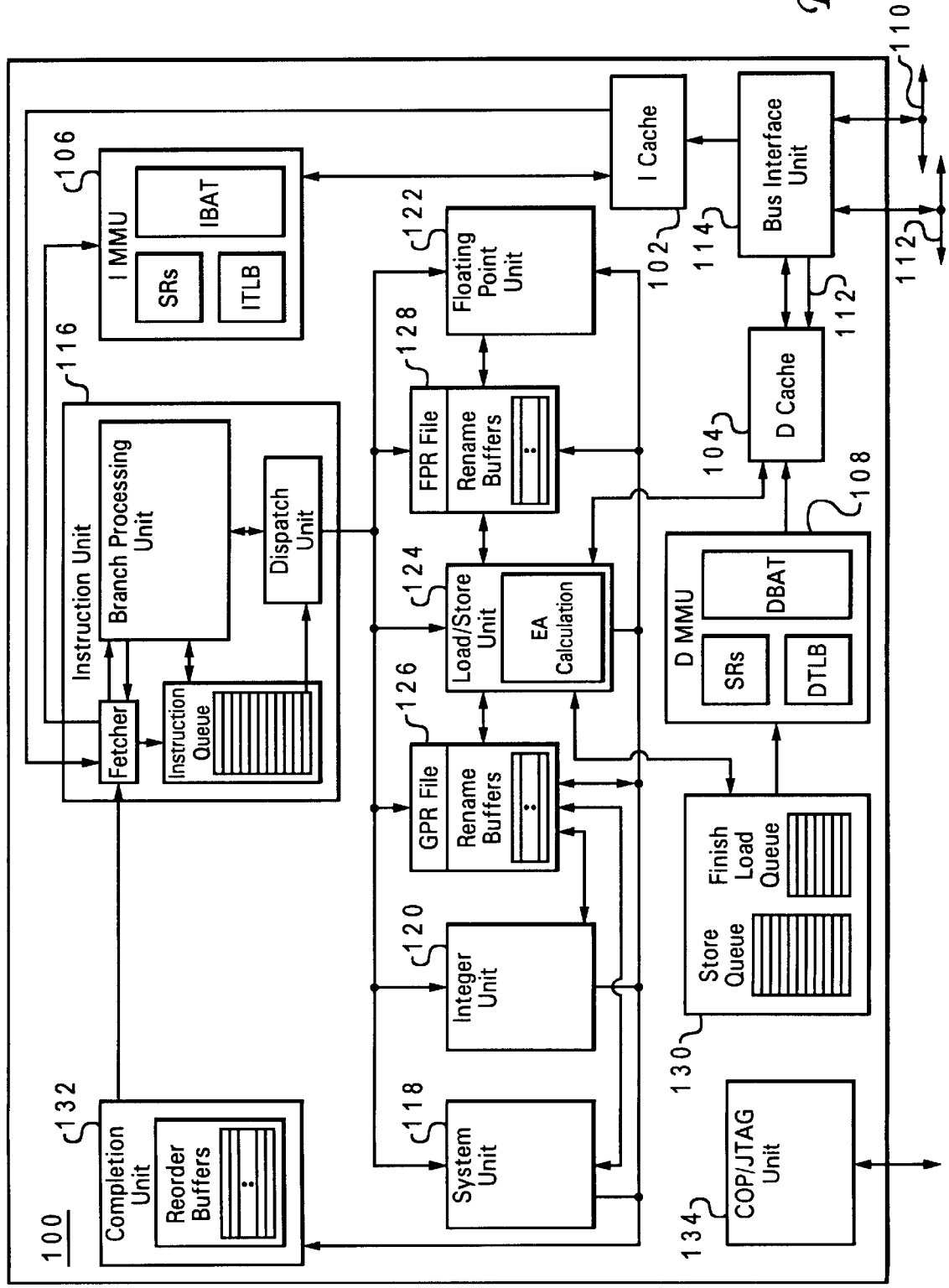
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar microprocessor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (and also including a Level 2 cache, cache and system memory not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to executions units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. The clock distribution system described below may be applied to many other single-chip designs; it is significant that all the elements of the processor shows will generally receive the same clock signal, and there should be as little skew as possible as the clock signal is distributed over the processor. All such variations are within the spirit and scope of the present invention.

Figure 2:
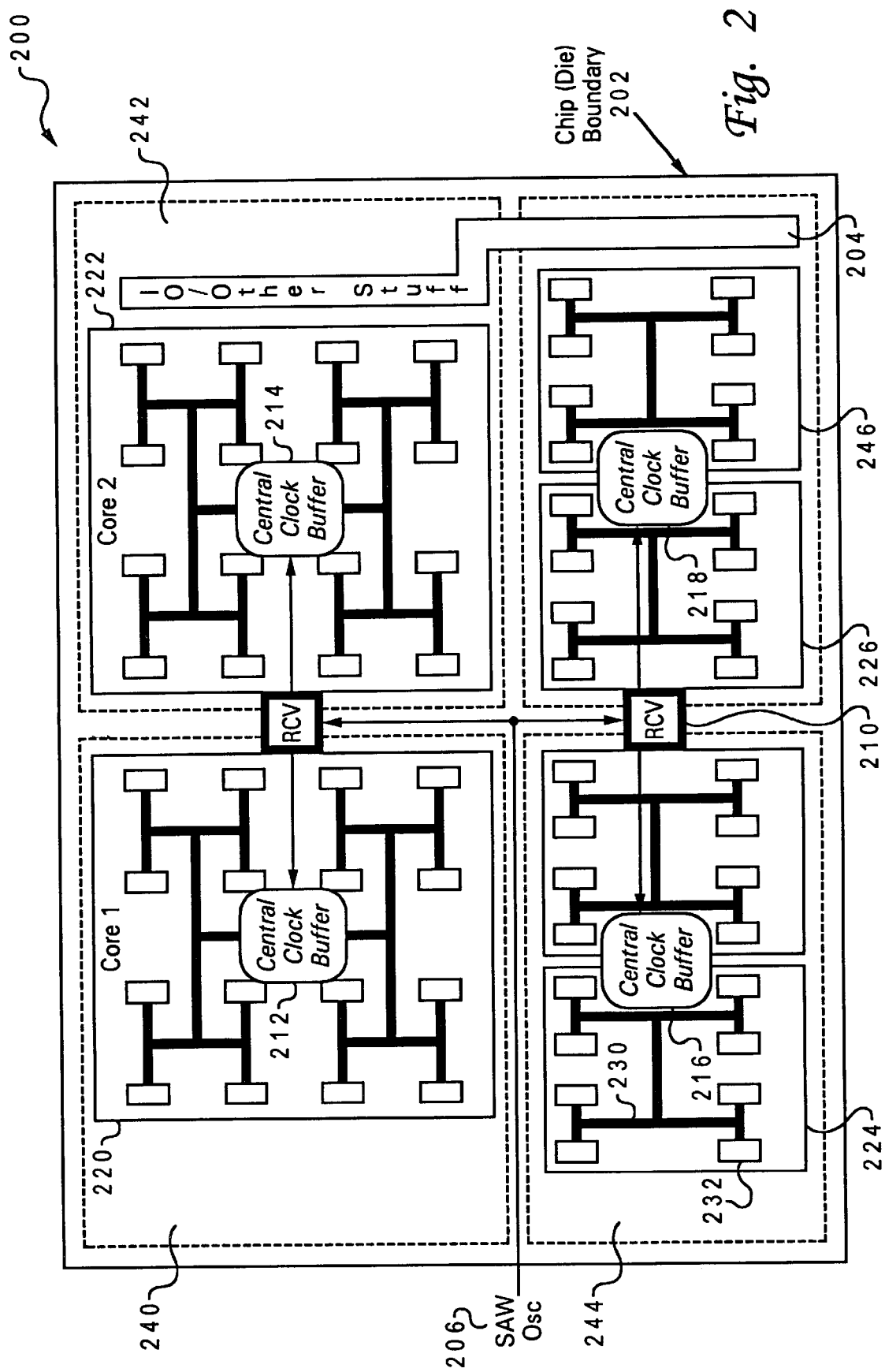
FIG. 2 is a high-level diagram of a microprocessor chip utilizing a clock distribution system in accordance with a preferred embodiment of the invention.

With reference now to FIG. 2, a high-level view of the clock distribution of a processor in accordance with the preferred embodiment is shown. In this figure, chip 200 is shown divided into four regions, the leftmost two regions comprising core 220 and its associated L2 cache 224, the rightmost two regions comprising core 222 and its associated L2 cache 226. Each of these regions is covered by a clock distribution mesh 240/242/244/246, which is described more fully as a "clock distribution network" in U.S. Pat. No. 5,656,963 to Masleid, et al., and which is hereby incorporated by reference. Each distribution mesh is connected to all of the logic within its region.

The main SAW Oscillator 206 will be received via 2 sets of differential receivers 210. The differential receiver circuits 210 will then each drive 2 Central Clock Buffers, 212/214 and 216/2118, respectively. Each Central Clock Buffer will drive an H-tree, e.g., 230, which will terminate in 16 sector buffers, e.g., 232, which re-power the clock signals. Each sector buffer will drive a secondary H-tree (not shown in this Figure) which will terminate onto its associated clock distribution mesh 240/242/244/246. Also shown is block 204, which represents other logic which can optionally be present on the chip, such as Input/Output circuitry. Also shown is chip boundary 202.

In the preferred embodiment, the central buffer: differential SAW receiver is followed by inverter, which is followed by a gain-enhanced split-drive clock buffer. The central clock buffer is inverting from the differential receiver output to the H-tree. The sector buffers are inverting, gain-enhanced split-drive clock buffers. The local clock buffers, as described below, are 3 stage inverting and 4 stage non-inverting varieties.

It should be noted that the mesh polarity matches C2 buffers, which are 4 stage, large-gain/large-area buffers, with small capacitance loads. C1 buffers and Scan C1 buffers are 3 stage, low-gain/low-area buffers with large capacitance loads.

Referring now to FIG. 3, a bit slice definition for a system in accordance with the preferred embodiment is shown. Note that the local clock buffer 302/304/306/308, which comprises the final stages of the clock buffer, shown in inset 310 as 312/314/316, have become part of the bit slice and these stages have a high enough gain to transfer the delta-I problem to the local buffers. In this figure, three stages are shown, but the local buffer may be comprised of any number (N) stages in order to accommodate the requirements of the specific implementation. In the preferred embodiment, the local clock buffer is 4 bits wide.

The final N stages are fed from the distribution mesh shown in FIG. 2, which is connected to the mesh clock input 318 of the local buffer. In the preferred embodiment, the buffer stages 302/304/306/308 in the bit slice 300 have been given a fixed location in the bit slice, between the middle 32 bits 332 of the 64-bit word and the most-significant and least-significant 16 bits, 330 and 334, respectively. The local buffer output signals, C1 and C2 and SCAN C1 (not shown here), feed only those circuits within the bit slice, which results in a much lower capacitance than would ordinarily be driven by the central clock buffers through the clock mesh. The local buffer is connected to the bit slice circuits at output 320, as shown in inset 310. Note that "stringers" 350 are parallel to the dataflow to allow the local clock buffers to connect to the clock distribution mesh.

The "delta-I" current from the clock distribution system is now negligible, because almost all of it is created by the local clock buffers which are evenly distributed over the chip. The delta-I problem, from a power distribution point of view, is therefore practically eliminated. Note that the capacitive loading on the mesh is much lower than before and this allows the mesh equalization to become more efficient.

A further advantage of N stages of gain in the local clock buffer is delay matching. It is often useful to generate CLK and CLK_ for local use and have CLK and CLK_ transition at the same time.

CLK and CLK_ require an even and odd number of inversions. Matching the delays of the CLK and CLK_ buffers is impractical for N=1. When the local gain is approximately 30, then three slow stages can provide CLK_ and four fast stages can provide CLK. Thus both high local gain and delay matching are provided.

Subordinate clock distributions for non-critical chip areas are allowed to have higher uncertainty in their edge times. Driving subordinate distributions must not degrade the premium clock distribution. Premium clock quality will not suffer significantly if the subordinate clock distribution begins with a small inverter driven by a large buffer in the premium chain. This 'retarded tap' must occur several inverter stages into the premium amplifier chain. The tap load will then require a negligible increase in premium gain and therefore add negligible jitter to the premium distribution. The subordinate distribution must build its gain from scratch, and its genesis signal is degraded by the Jitter induced by the premium chain amplifiers prior to the tap.

The total capacitance (Cg) for the central H-tree is simply the sum of the 16 sector buffer input capacitances. Given the large wire load of the central tree, Cg is arbitrarily set to $\frac{1}{5}$ of Cw, which is the central tree wire capacitance load.

The input capacitance of the sector buffers is therefore set to:

6.0 pF/16=375 fF or 500 u of device.

Cw is 30 pF. The wire load on a sector buffer consists of a single H-tree tier MQ/LM (metal layer 5/metal layer 6 of the chip) of 11.4 mm span, where all segments are fingered and interlaced with inductive returns, and four H-tree tier MQ/LM of 5.7 mm span.

FIG. 4 shows a flowchart of a method for distributing an external clock signal to various segments of a chip in accordance with the preferred embodiment. The method includes the steps of accepting the external clock signal (step 410); deriving a plurality of separate clock signals from the external clock signal using a network of branching wires, the network of branching wires forming a first level and a last level (step 420), wherein the last level includes a plurality of final drivers; transmitting the plurality of separate clock signals to the plurality of final drivers (step 430); and vertically and horizontally interconnecting all of the plurality of final drivers with a x-y grid to transmit the plurality of separate clock signals from the final drivers to the chip (step 440). In the preferred embodiment, the final drivers level provides a gain of at least 25.

While the invention has been particularly shown and described with reference to a preferred embodiment, it will be understood by;those skilled in the art that various changes in form and detail may be made therein without departing from the spirit and scope of the invention, and are expected to fall within the scope of the claims.

What is claimed is:

1. A clock distribution network, comprising
   a primary input for accepting a primary clock signal;
   tree means for deriving a plurality of separate clock signals from the primary clock signal, the tree means including
      a first level and a last level, wherein the last level includes a plurality of final drivers located on a chip;
      repower means for transmitting the plurality of separate clock signals to the plurality of said final drivers; and
   an X-Y grid for vertically and horizontally connecting all of the plurality of final drivers,
   wherein said last level provide a gain of at least 25.

2. A network as in claim 1, wherein said final drivers are are physically located on said chip between a first set and a second set of bits in a single word line.

3. A network as in claim 1, wherein the delta-I of said network is reduced.

4. A network as in claim 1, wherein the primary input includes a pre-driver buffer.

5. A network as in claim 1, wherein the tree means comprises a network of branching wires laid out in a hierarchal succession of H's to form various levels.

6. A network as in claim 1, wherein the repower means comprise repower buffers.

7. A method for distributing an external clock signal to various segments of a chip, the method comprising the steps of:

(a) accepting the external clock signal;

(b) deriving a plurality of separate clock signals from the external clock signal using a network of branching wires, the network of branching wires forming a first level and a last level, wherein the last level includes a plurality of final drivers;

(c) transmitting the plurality of separate clock signals to the plurality of final drivers; and (d) vertically and horizontally interconnecting all of the plurality of final drivers with a x-y grid to transmit the plurality of separate clock signals from the final drivers to the chip, whereby said last level provides a gain of at least 25.

8. A method as in claim 7, wherein step (a) further includes the step of accepting the external clock signal at a primary chip input.

9. A method as in claim 7, wherein step (c) further includes the step of transmitting the plurality of separate clock signals using a plurality of repower buffers.

10. A method as in claim 7, further comprising the step of transmitting the plurality of separate clock signals from the plurality of final drivers to a plurality of final circuit loads, from a physical location between the bits of a single word-line of said final circuit loads, to reduce the delta-I of the network.

11. A clock distribution network, comprising a primary chip input for accepting a primary clock signal;

a network of branching wires coupled to the primary chip input for deriving a plurality of separate clock signals from the primary clock signal, the network of branching wires having a first level and a last level, wherein the last level includes a plurality of final drivers located on a chip;

repower means for transmitting the plurality of separate clock signals to the plurality of final drivers; and a grid comprising intersecting wires forming a plurality of intersections for coupling the plurality of final drivers, wherein each one of the plurality of final drivers is connected to the grid at respective intersection, and wherein the grid transmits the plurality of clock signals from the final drivers to the chip, and wherein the delta-I of the distribution network is reduced.

\* \* \* \* \*